United States Patent
Kino et al.

(10) Patent No.: US 8,425,093 B2
(45) Date of Patent: Apr. 23, 2013

(54) LIGHTING DEVICE

(75) Inventors: Norihito Kino, Aichi-ken (JP); Satoshi Inagaki, Aichi-ken (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 186 days.

(21) Appl. No.: 12/588,393

(22) Filed: Oct. 14, 2009

(65) Prior Publication Data

US 2010/0165650 A1 Jul. 1, 2010

(30) Foreign Application Priority Data

Dec. 25, 2008 (JP) ................................ 2008-331447

(51) Int. Cl.
*B60Q 1/00* (2006.01)
*B60Q 1/26* (2006.01)

(52) U.S. Cl.
USPC ........................... 362/490; 362/488; 362/489

(58) Field of Classification Search .......... 362/459–549, 362/600–634
See application file for complete search history.

(56) References Cited

U.S. PATENT DOCUMENTS

| | | | |
|---|---|---|---|
| 4,929,866 A | 5/1990 | Murata et al. | |
| 2004/0208003 A1* | 10/2004 | Kuo ............................... | 362/241 |
| 2006/0171156 A1* | 8/2006 | Sawayanagi et al. ......... | 362/492 |
| 2006/0227572 A1* | 10/2006 | Chen ............................. | 362/633 |
| 2008/0049435 A1* | 2/2008 | Yoshihara et al. ............ | 362/488 |
| 2009/0021668 A1* | 1/2009 | Cheng et al. .................. | 362/620 |
| 2009/0154196 A1* | 6/2009 | Lin et al. ....................... | 362/613 |

FOREIGN PATENT DOCUMENTS

| | | |
|---|---|---|
| JP | 07-130208 A | 5/1995 |
| JP | 2000-127847 | 5/2000 |
| JP | 2007-210395 A | 8/2007 |
| JP | 2008-53065 | 3/2008 |

OTHER PUBLICATIONS

Japanese Office Action dated Jun. 19, 2012 with an English translation thereof.

* cited by examiner

*Primary Examiner* — William Carter
(74) *Attorney, Agent, or Firm* — McGinn IP Law Group, PLLC

(57) ABSTRACT

In a lighting device provided on a ceiling of an interior of a vehicle, the lighting device has: a map lamp including: a case; a first light guide plate accommodated in the case, and having a light incident area on an end face and a light radiation area on a flat plate surface of the interior side of the vehicle; a first light source part having a plurality of LED lamps, the LED lamps being opposed to the light incident area and arranged in an array; and a prism lens provided in the light radiation area side of the first light guide plate. The map lamp allows the light of the first light source part to be incident on the first light guide plate from the light incident area, radiates the light from the light radiation area to convert the light into a planar light, and then converts the light into a light advancing in a prescribed direction to light a prescribed area in the interior of the vehicle.

16 Claims, 4 Drawing Sheets

LIGHTING DEVICE

BACKGROUND OF THE INVENTION

1. Field of the Invention

The present invention relates to an improvement of a lighting device used in an interior of a vehicle.

2. Description of the Related Art

In a lighting device for an interior of a vehicle, since a map lamp for lighting a part near the hand of a person riding on the vehicle or a room lamp for lighting a wide area in the interior of the vehicle is provided in a restricted area such as a ceiling in the interior of the vehicle, the lamp needs to be compact and thin. For instance, patent literature 1 discloses a lighting device using an LED lamp as a light source of a map lamp. Further, patent literature 2 discloses a room lamp including an LED lamp and a light guide plate to convert the light of the LED lamp to a planar light by the light guide plate and light an interior of a vehicle.

Patent literature 1: JP-A-2008-53065

Patent literature 2: JP-A-2000-127847

In the structure of the patent literature 1, since the LED lamp is a point light source and its directivity is higher than that of a bulb lamp, an area (glare) where a luminance is excessively high may occasionally generated to dazzle a person riding on the vehicle. Further, in the LED lamp that the light of an LED element is mixed with a fluorescence by a fluorescent material dispersed in a seal member to radiate the light of a prescribed color, the light of the LED element is not sufficiently mixed with the fluorescence so that a color shade or a color separation may arise. Further, when such a radiated light of the LED lamp is converged by a lens, the color shade or the color separation is more outstanding due to the aberration of the lens. Since the map lamp is used when the person riding on the vehicle looks at a map to light a spot on the map, such glare, color shade and color separation especially cause a problem. Further, when the lighting device is externally observed, the LED lamp is visually recognized, so that an outward appearance is not good. Further, since the structure of the patent literature 1 separately includes the light source of the map lamp and the light source of the room lamp, the number of parts is increased, an attaching operation is complicated and a cost is undesirable. As one of countermeasures for solving the problems, such a structure as in the patent literature 2, that is, the structure in which the LED lamp and the light guide plate are used to form the planar light may be supposed to be applied to the map lamp. However, since the light of the map lamp requires the directivity and the luminance higher than those of the light of the room lamp, when the light of the LED lamp as the point light source is simply converted into the planar light by the light guide plate, the directivity and the luminance necessary for the light of the map lamp cannot be obtained. Further, the structure of the patent literature 2 includes the map lamp and the room lamp integrally, however, since the directions of the lights irradiated therewith are different from each other, the light source parts thereof are separately provided. Therefore, controlling harnesses need to be managed by the light source parts respectively so that an attaching operation is complicated. Further, a labor for inspecting a product is increased. Further, since a heat radiating member needs to be separately provided as well as the harnesses, the number of parts is undesirably increased.

SUMMARY OF THE INVENTION

Thus, it is an object of the present invention to provide a structure in which the generation of a glare, a color shade or a color separation is prevented in a lighting device including a map lamp using an LED lamp. Further, it is an object of the present invention to provide a structure that can obtain a sufficient quantity of light and luminance in a lighting device including a map lamp using an LED lamp. Further, it is an object of the present invention to provide a structure that has the small number of parts and is easy in an attaching operation.

In order to achieve the object, according to a first aspect of the present invention, a lighting device provided on a ceiling of an interior of a vehicle comprises a map lamp including a case, a first light guide plate accommodated in the case, and having a first light incident area on an end face and a first light radiation area on a flat plate surface of the interior side of the vehicle, a first light source part having a plurality of LED lamps, the LED lamps being opposed to the first light incident area and arranged in an array; and a prism lens provided in the first light radiation area side, wherein the map lamp allows the light of the first light source part to be incident on the first light guide plate from the first light incident area, radiates the light from the first light radiation area to convert the light into a planar light, and then converts the light into a light advancing in a prescribed direction to light a prescribed area in the interior of the vehicle.

In the lighting device of the present invention, the first light guide plate emits a planar light by the lights of the LED lamps to radiate the planar light. The planar light lights the prescribed area in the interior of the vehicle through the prism lens so that the lighting device functions as the map lamp. The lights of the LED lamps are guided or introduced to the light guide plate and mixed together to equalize a luminance. Further, since the luminance per unit area in a light-emitting surface is made to be lower than that of a usual point shaped light, the generation of glare is prevented. Further, when the lights are guided or introduced to the first light guide plate, since the lights are mixed together, the generation of a color shade or a color separation is prevented. Further, since the lights of the first light source are converted into the light advancing in the direction of the prescribed area by the prism lens, a sufficient quantity of light and luminance are obtained as the light of the map lamp in the area. Further, since the lights are temporarily converted into the planar light and sufficiently mixed together, and then, the planar light passes through the prism lens, the color separation due to the aberration of the lens hardly arise. As described above, according to the lighting device of the present invention, the LED lamps as the point light sources are used to emit the planar light in the light guide plate so that the lighting device may be preferably used as the map lamp.

According to a second aspect of the present invention, a lighting device is provided, in addition to the structure according to a first aspect, which further has a room lamp including a second light guide plate provided integrally with the first light guide plate and having a second light incident area on an end face, a second light radiation area on a flat plate surface of the interior side of the vehicle and a connecting area connected to a side part of the first light guide plate on a side surface; and a second light source part having a plurality of LED lamps, the LED lamps being opposed to the second light incident area and arranged in an array; wherein the room lamp allows the light of the second light source part to be incident on the second light guide plate from the second light incident area and radiates the light from the second light radiation area to convert the light into a planar light to light the interior of the vehicle. The lighting device integrally includes the map lamp and the room lamp and the first light guide plate used for the map lamp and the second light guide plate used for the room lamp are integrally formed. Since both the map lamp and the room lamp are formed with the LED lamps and the light guide plates, an entire part of the device may be formed to be thinner than a case that a bulb lamp is used. Since the lighting device of the present invention is provided in a restricted area such as a ceiling of the vehicle, the thin lighting device is provided in such a way to improve a degree of freedom in design.

According to a third aspect of the present invention, a lighting device is provided, in addition to the structure according to the second aspect, wherein the end face having the first light incident area of the first light guide plate and the end face having the second light incident area of the second light guide plate are located on the same virtual plane, and the first light source and the second light source are provided on the same base plate. Thus, the number of parts is reduced and an attaching workability is improved. Further, since the same base plate is used, harnesses do not need to be managed to control the first light source and the second light sources respectively. Thus, the number of parts is effectively reduced, the attaching workability is improved and a labor for inspecting a product is reduced. Further, heat radiating mechanisms doe not need to be separately provided in the first light source and the second light source respectively to make the device compact.

According to a fourth aspect of the present invention, a light shield unit is provided in the connecting area in the structure according to the second aspect or the structure according to the third aspect. By the light shield unit, the movement of the light is prevented between the first light guide plate and the second light guide plate. Thus, the light guided or introduced to the first light guide plate is prevented from leaking to the second light guide plate and the light guided or introduced to the second light guide plate is prevented from leaking to the first light guide plate. As a result, when the device is externally observed during the emission of the light, an outward appearance is good. The light shield unit is not especially limited. A space part is provided or a member high in its reflection property, members having different refractive indexes or a member low in its light transmittance are provided, which may be adopted as the light shield unit. When the member high in its reflection property is provided among them, the light guided or introduced to the first light guide plate is prevented from leaking to the second light guide plate and the light is reflected toward the first light guide plate to make the light incident on the first light guide plate again. Thus, the utilization factor of the light is improved.

According to a fifth aspect of the present invention, the light shield unit is a slit shaped through hole along the side surface of the first light guide plate in the structure according to the fourth aspect. By this through hole, the light guided or introduced to the first light guide plate is prevented from leaking to the second light guide plate and the light guided or introduced to the second light guide plate is prevented from leaking to the first light guide plate. Thus, when the device is externally observed during the emission of the light, an outward appearance is good. The form of the through hole is not especially limited, however, the through hole is preferably provided so as to extend along the side surfaces of the first light guide plate and the second light guide plate, because the leakage of the light is effectively prevented.

According to a sixth aspect of the present invention, a lighting device is provided, in addition to the structure according to the fifth aspect, wherein the case includes a rib shaped protrusion fitted to the through hole in the connecting area of the first light guide plate and the second light guide plate. Thus, a light shield effect in the through hole part of the first light guide plate and the second light guide is improved and the first light guide plate and the second light guide plate are easily positioned by the rib shaped protrusion. When a slit shaped recessed part of a connecting part is provided from the interior side of the vehicle to the ceiling side, the rib shaped protrusion serves as a partition plate for partitioning a room lamp area and a map lamp area. Thus, the lighting device is externally observed, an outward appearance is preferable to improve design characteristics.

According to a seventh aspect of the present invention, a lighting device is provided, in addition to the structure according to any one of the second to the sixth aspects, further comprising: a vessel that is provided in the interior side of the vehicle of the prism lens, sandwiches the first light guide plate, the second light guide plate and the prism lens between the case and the vessel and has a frame shaped protrusion for dividing a map lamp light emitting part corresponding to the first light radiation area and a room lamp light emitting part corresponding to the second light radiation area. The "frame shaped protrusion" mentioned herein forms a continuous wall surface with a prescribed height. In the present exemplary embodiment, the frame shaped protrusion forms the wall surface of the prescribed height continuously extending along a boundary part of the map lamp light emitting part and the room lamp light emitting part. Thus, the frame shaped protrusion serves as a partition plate for partitioning the room lamp area and the map lamp area so that the radiated light (the light of the map lamp light emitting part) that is radiated from the light radiation area of the first light guide plate is prevented from leaking to the room lamp light emitting part and the radiated light (the light of the room lamp light emitting part) that is radiated from the light radiation area of the second light guide plate is prevented form leaking to the map lamp light emitting part. Thus, the outward appearance is more preferable. Further, the frame shaped protrusion may be fitted to the through hole of the connecting area. Thus, the leakage of the light can be more prevented in the through hole of the connecting area.

Now, an exemplary embodiment of the present invention will be described below by referring to the drawings.

DESCRIPTION OF THE PREFERRED EMBODIMENTS

Figure 1:
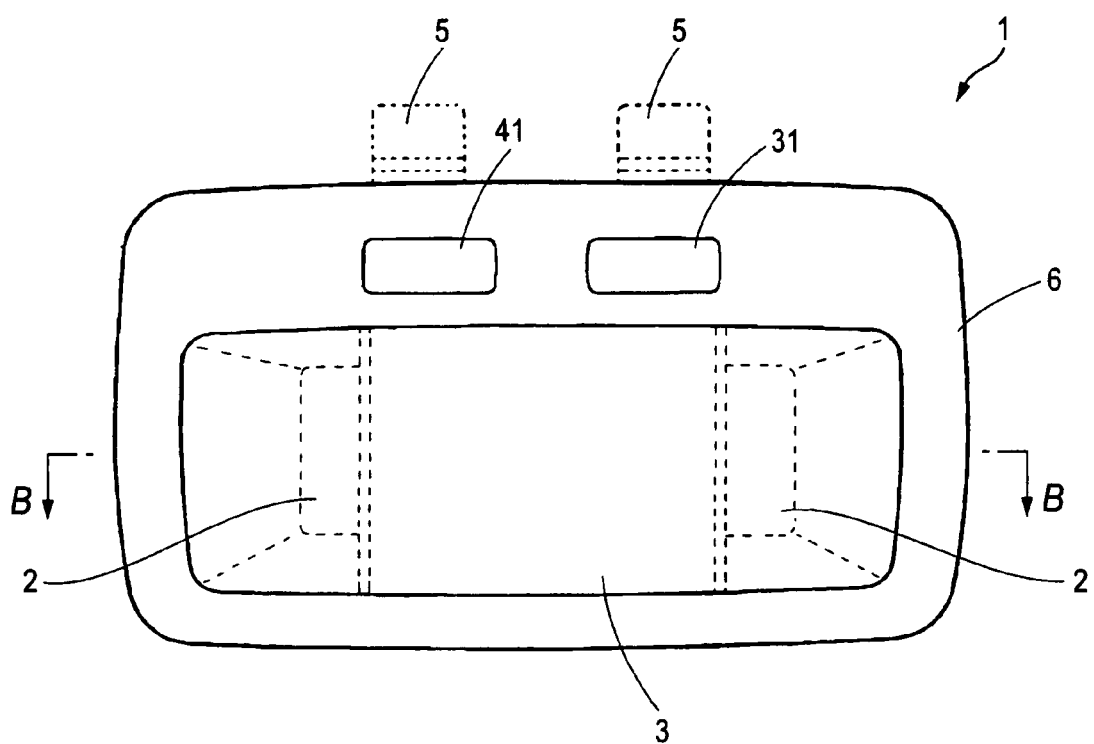
FIG. 1 is a view of a lighting device 1 seen from an interior side of a vehicle.
Figure 2:
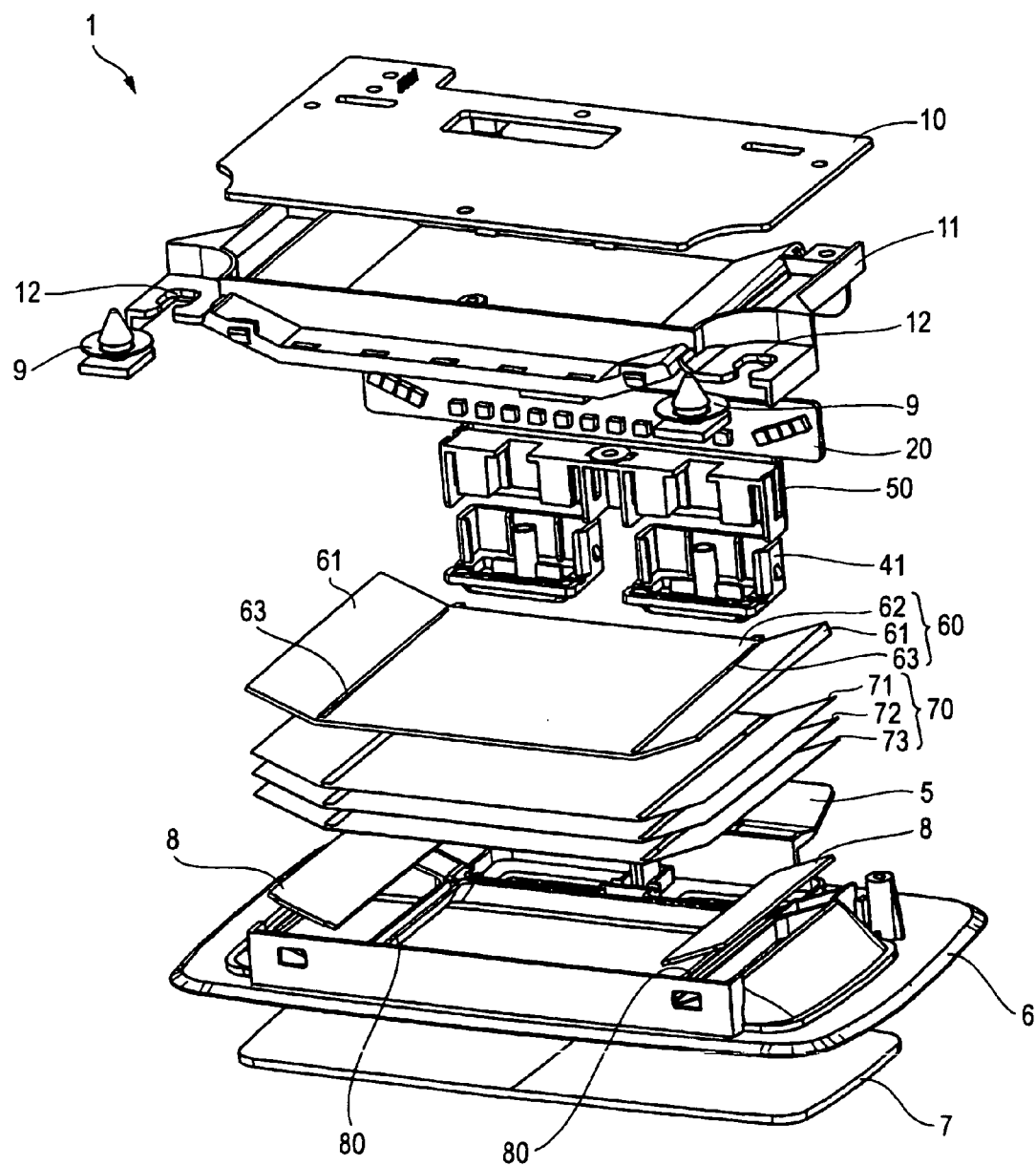
FIG. 2 is an exploded perspective view of the lighting device 1.

FIG. 1 shows a diagram of a lighting device 1 of an exemplary embodiment of the present invention seen from an interior side of a vehicle. An exploded perspective view of the lighting device 1 is shown in FIG. 2. The lighting device 1 is provided on a ceiling in the interior of a vehicle between a driver's seat and an assistant's seat. As shown in FIG. 1, the lighting device 1 roughly includes map lamp light emitting parts 2 provided at two right and left parts, a room lamp light emitting part 3 provided in a center, switch knobs 31 and a vessel 6. More specifically, as shown in FIG. 2, the lighting device 1 includes, in order from the ceiling side of the vehicle, a control circuit board 10, a case 1, a light source base plate 20, a switch housing 50, the switch knobs 31 and 41, a light guide plate 60, an optical sheet 70, a prism lens 8, the vessel 6 and fixing clips 9. The case 11 has a substantially flat plate form and includes recessed parts 12 at corner parts in the front side of the vehicle (an upper part of the sheet surface of FIG. 1). The lighting device 1 is attached to the ceiling (not shown in the drawing) of the interior of the vehicle through the fixing clips 9 and an attaching protrusion 5 provided in a below-described vessel 6.

Figure 3A:
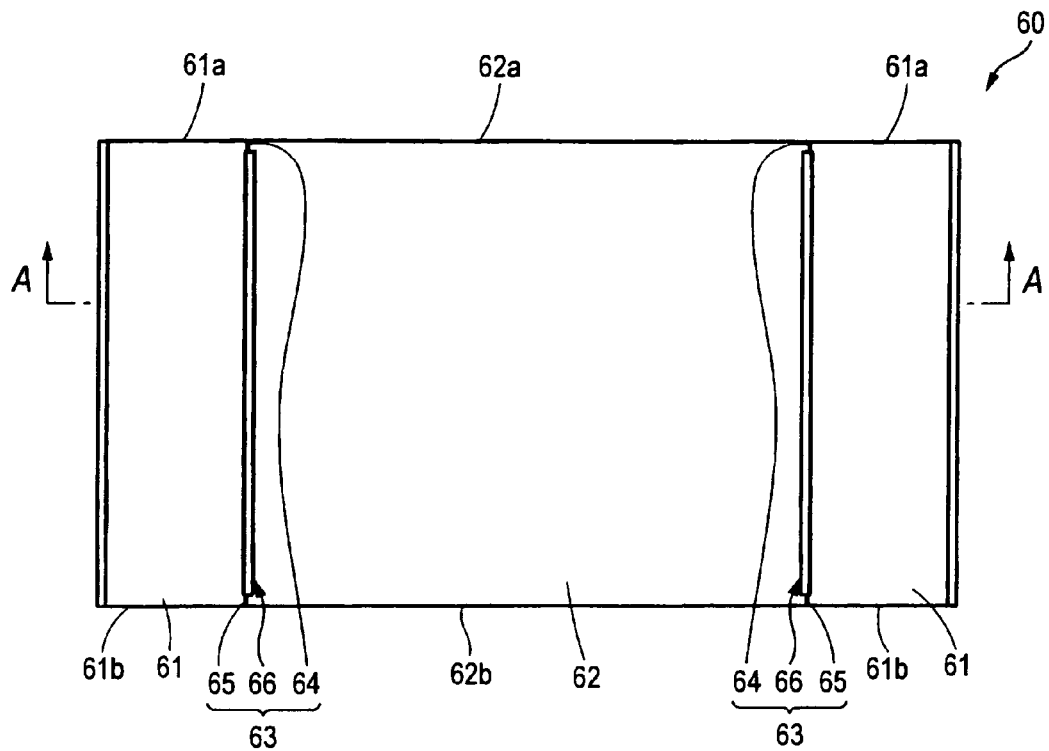
FIG. 3A is a top view of a light guide plate 60 and FIG. 3(B) is a sectional view taken along a line A-A of FIG. 3(A).
Figure 3B:
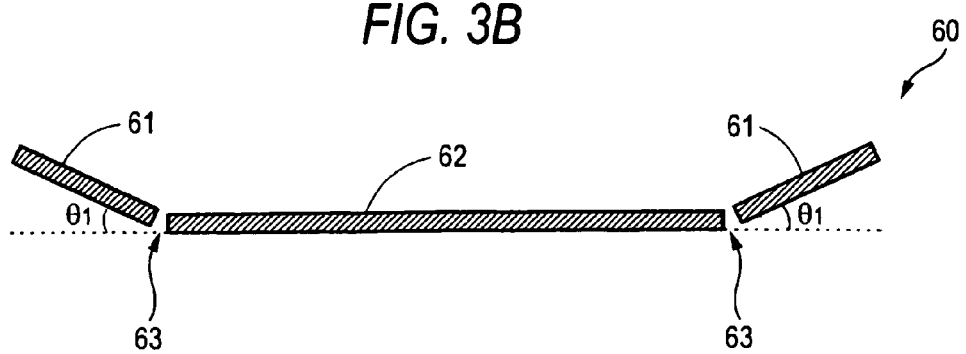

The light guide plate 60 is provided in the interior side of the vehicle in the case 11. FIG. 3(A) shows a top view of the light guide plate 60. FIG. 3(B) shows a sectional view taking along a line A-A in FIG. 3(A). As shown in FIG. 3(A), the light guide plate 60 includes two first light guide plates 61 and one second light guide plate 62. The first light guide plates 61 and the second light guide plate 2 are made of a colorless and transparent acryl material. The first light guide plates 61 are arranged at both right and left sides of the second light guide plate 62 and the light guide plates are formed integrally through connection parts 63. The first light guide plate 61 has a substantially flat plate form. The first light guide plate 61 has a thickness that is smaller from an end part 61a toward an opposite end part 61b. The second light guide plate similarly has a substantially flat plate form and has a thickness that is smaller from an end part 62a toward an opposite end part 62b. The connection part 63 includes connecting parts 64 and 65 and a slit part 66. The connecting part 64 connects the end part 61a of the first light guide plate 61 to the end part 62a of the second light guide plate 62. The connecting part 65 connects the end part 61b of the first light guide plate 61 to the end part 62b of the second light guide plate 62. On the other hand, the slit part 66 is a through hole formed continuously in the form of a straight line from a part near the end part 61a to a part near the end part 61b. The first light guide plate 61 is formed with a prescribed angle relative to the second light guide plate 62. In the present exemplary embodiment, as shown in FIG. 3(B), an angle θ formed by the second light guide plate 62 and the first light guide plate 61 is about 20°. As described above, the first light guide plate 61 and the second light guide plate 62 are integrally formed. However, in areas excluding the parts near both the end parts 61a and 61b, the through holes (the slit parts 66) are provided between the first light guide plates 61 and the second light guide plates. Thus, the first light guide plates 61 and the second light guide plate 62 are not substantially continuous. On the back surfaces (surfaces opposite to the interior of the vehicle) of the first light guide plates 61 and the second light guide plate 62, a micro-lens machining process is applied as a light reflecting process. As the light reflecting process, a white color painting process may be used as well as a reflection lens machining process such as the micro-lens machining process.

Figure 4:
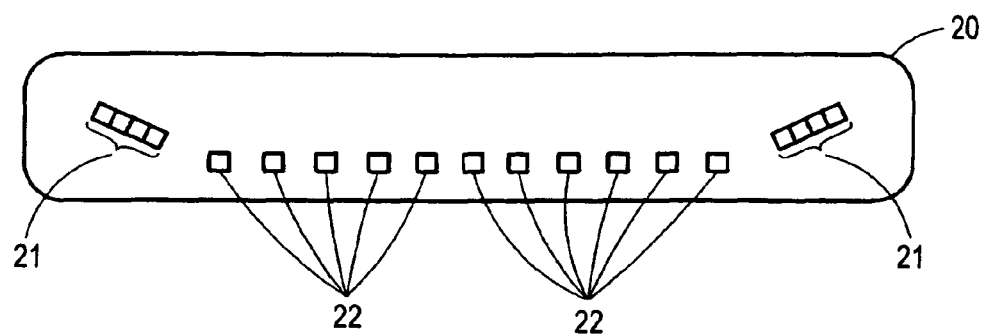
FIG. 4 is a front view of a light source base plate 20.

The light source base plate 20 is provided in the end part 61a side of the first light guide plate 61 and the end part 62a side of the second light guide plate 62. FIG. 4 shows a front view of the light source base plate 20. On a mounting surface of the light source base plate 20, eight first LED lamps 21 and eleven second LED lamps 22 are provided. The four first LED lamps 21 are arranged in the form of an array along the end part 61a of each of the first light guide plates 61. The second LED lamps 22 are arranged in the form of an array along the end part 62a of the second light guide plate 62 in the longitudinal direction of the light source base plate 20. The first LED lamp 21 is a white color LED lamp obtained by combining a yellow fluorescent material with a blue color LED chip. The second LED lamps 22 include six white color LED lamps obtained by combining the yellow fluorescent materials with the blue color chips and five amber color LED lamps.

As the white color LED lamp, a white color LED lamp obtained by combining the yellow fluorescent material and a red fluorescent material with the blue color LED chip may be employed. The light source base plate 20 is electrically connected to the control circuit board 10. The lighting states of the white color LED lamps and the amber color LED lamps are controlled through the control circuit board 10 so that the color temperatures of light emitting colors may be adjusted. In the present exemplary embodiment, the color temperature of the light emitting colors is adjusted to represent a lighting mode imitating a sunrise or a sunset.

The optical sheet 70 is provided in the interior side of the vehicle of the light guide plate 60. As shown in FIG. 2, the optical sheet 70 includes, in order from the light guide plate 60 side, a diffusing sheet 71, a vertical prism sheet 72 and a horizontal prism sheet 73. Further, the vertical prism sheet 72 is a sheet in which a polyester film layer having the form of the vertical prism is formed on the surface of a base material made of an acrylic resin. The horizontal prism sheet 73 is a sheet in which a polyester film layer having the form of the vertical prism is formed on the surface of a base material made of an acrylic resin. The forms of the sheets 71, 72 and 73 are substantially the same and respectively have substantially the same form in plan view as that of the surface of the light guide plate 60 in the interior side of the vehicle. The sheets respectively include opening parts having the same forms in plan view at positions corresponding to the slit parts 66 of the light guide plate 60. The lights guided or introduced to the first light guide plate 61 or the second light plate 62 and outputted from the front surfaces of the light guide plates pass through the optical sheet 70. Thus, the light flux thereof is adjusted to improve the luminance of the front surface.

The prism lens 8 is located in the interior side of the vehicle of the optical sheet 70 and provided at a position opposed to the first light guide plate 61. The prism lens 8 is provided in parallel with the first light guide plate 61. The prism lens 8 is made of a colorless and transparent acrylic material and has a prescribed prism cut applied in the interior side of the vehicle to converge the lights radiated from the first light guide plate 61 to a prescribed direction (a direction of the hand of a person riding on the vehicle).

The switch knobs 31 and 41 and the switch housing 50 are provided in the back part of the light source base plate 20. The switch knobs 31 and 41 are tact switches (momentary switches) and connected to the control circuit board 10 to control the first LED lamps 21 to be turned on and off. The second LED lamps 22 are controlled to be turned on and off in cooperation with opening and closing operations of a vehicle door 8 (not shown in the drawing).

Figure 5:
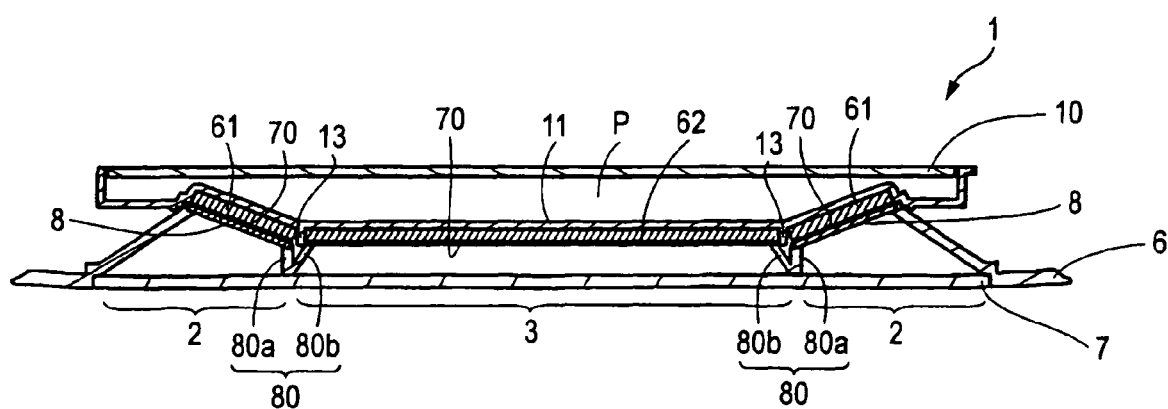
FIG. 5 is a sectional view taken along a line B-B of the lighting device 1 shown in FIG. 1.

The vessel 6 faces the interior side of the vehicle and sandwiches the light source base plate 20, the switch housing 50, the switch knobs 31 and 41 for the map lamp, the light guide plate 60, the optical sheet 70 and the prism lens 8 between the case 11 and the vessel 6. A central area of the vessel 6 is opened and covered with an outer lens 7. In a rear side (an upper part of the sheet surface of FIG. 1) of the vehicle of the vessel 6, two attaching protrusions 5 are provided. Inside the vessel 6, ribs 80 are provided upright. FIG. 5 shows a sectional view taken along a line B-B in FIG. 1. As shown in FIG. 5, the ribs 80 are frame shaped protrusions forming wall surfaces continuously extending with a prescribed height along the connection parts 63 of the first light guide plates 61 and the second light guide plate 62 and divide the right and left areas (map lamp areas) 2 corresponding to the first light guide plates 61 from the central area (the room lamp light emitting area) 3. The rib 80 includes a first rib 80a and a second rib 80b and has a sectional form of a V shape closing in the interior side of the vehicle. An upper end of the first rib 80*a* abuts on the prism lens 8 to support the prism lens 8. On the other hand, an upper end of the second rib 80*b* abuts on the optical sheet 70 along the edge part of the second light guide plate 62.

As shown in FIG. 5, inside the case 11, rib shaped protrusions 13 are provided along the side parts of the second light guide plate 62. The rib shaped protrusions 13 are fitted to the slit parts 66 of the light guide plate 60. Thus, the leakage of the light is prevented between the first light guide plates 61 and the second light guide plate 62, and the first light guide plates 61 and the second light guide plate 62 are easily positioned.

Now, a light emitting operation of the lighting device 1 will be described below. Initially, when the switch knobs 31 and 41 are pressed to turn on the first LED lamps 21. The lights of the first LED lamps 21 are incident on the first light guide plate 61 from the first end part 61*a* of the first light guide plate 61 opposed to the first LED lamps 21 and guided or introduced to the first light guide plate 61. The guided lights are reflected by the back surface of the first light guide plate 61 and radiated from the front surface (the interior side of the vehicle) to be changed to a planar light. The radiated planar light is diffused by the diffusing sheet 71 to equalize the luminance. Then, the light flux thereof is adjusted by the vertical prism sheet 72 and the horizontal prism sheet 73 to improve the luminance. Then, the planar light is converged to a part near the hand of the person riding on the vehicle in the form of a spot by the prism lens 8 to become the light of the map lamp. The light of the map lamp is a light resulting from the lights of the first LED lamps 21 as point light sources. When the lights of the first LED lamps are converted into the planar light through the first light guide plate 61, a mixture of the lights is accelerated to equalize the luminance and prevent the generation of glare and a color shade. Further, since the planar light is formed by the light guide plate 60, a color separation is hardly generated, Further, after the luminance of the front surface is improved by the optical sheet 70, since the light is applied to a desired direction by the prism lens 8, a sufficient quantity of light is obtained.

On the other hand, when the vehicle door is opened, the second LED lamps 22 are turned on in cooperation therewith. The lights of the second LED lamps 22 are incident on the second light guide plate 62 from the end part 62*a* of the second light guide plate 62 and guided to the second light guide plate 62. The guided lights are reflected by the back surface of the second light guide plate 62 and radiated from the front surface (the interior side of the vehicle) to be changed to a planar light. The radiated planar light is diffused by the diffusing sheet 71 to equalize the luminance. Then, in order to improve the luminance, the light flux thereof is adjusted by the vertical prism sheet 72 and the horizontal prism sheet 73. Then, the planar light becomes the light of a room lamp for widely lighting the interior of the vehicle.

As described above, the lighting device 1 serves as two kinds of lighting forms of the map lamp and the room lamp. In both the lamps, the lights of the LED lamps as the point light sources are converted into the planar light to be used. Here, the lighting device 1 is provided in the ceiling between the driver's seat and the assistant's seat. As shown in FIG. 3(B), the first light guide plate 61 of the map lamp light emitting part 2 is provided to be inclined to the second light guide plate 62 of the room lamp light emitting part 3 and faces the driver's seat side and the assistant's seat side. Thus, the interior of the vehicle may be widely lighted by the light of the room lamp light emitting part 3 and the part near the hand of the person riding on the vehicle may be preferably lighted by the light of the map lamp light emitting area 2. Further, since the first light guide plates 61 and the second light guide plate 62 are integrally formed, the number of parts is reduced and an attaching workability is improved.

The first light guide plates 61 and the second light guide 62 are integrally formed. However, the slit parts 66 are provided in the connection parts 63 of the first light guide plates 61 and the second light guide plate 62 to prevent the lights guided to the first light guide plates 61 from being incident on the second light guide plate 62 and prevent the lights guided to the second light guide plate 62 from being incident on the first light guide plates 61. Thus, an outward appearance is preferable when the lamps are turned on. Further, the rib shaped protrusions 13 of the case 11 are fitted to the slit parts 66. Thus, the lights guided or introduced to the first light guide plates 61 are more prevented from being incident on the second light guide plate 62 and the lights guided or introduced to the second light guide plate 62 are more prevented from being incident on the first light guide plates 61. Thus, the outward appearance is more preferable when the lamps are turned on. Further, by the ribs 80 of the vessel 6, the lights radiated form the first light guide plates 61 are prevented from being observed from the room lamp light emitting part 3, and the lights radiated from the second light guide plate 62 are prevented from being observed from the map lamp light emitting part 2. Thus, the outward appearance is more improved when the lamps are turned on. In the present exemplary embodiment, the rib shaped protrusions 13 of the case 11 are fitted to the slit parts 66, however, in place thereof, a part of the ribs 80 of the vessel 6 may be fitted to the slit parts 66. The same effect is also achieved thereby.

In the present invention, since the first LED lamps 21 and the second LED lamps 22 are used as a light source, the lighting device is formed to be thinner than a case that a bulb type lamp is used. Further, in the light guide plate 60, the right and left first light guide plates 61 are inclined at a prescribed angle θ relative to the second light guide plate 62, a space part P (see FIG. 5) is formed in the ceiling side of the vehicle, devices (not shown in the drawing) mounted on the control circuit board 10 are respectively accommodated in the space part P, so that the lighting device is made to be thinner. Further, since the first LED lamps 21 and the second LED lamps 22 are provided on the same base plate, harnesses do not need to be managed, the number of parts is effectively reduced, an attaching workability is improved and a labor for inspecting a product is reduced.

The present invention is used as the lighting device of the interior of the vehicle.

The present invention is not limited to above-described embodiment and the explanation of the embodiment. The present invention includes various kinds of modified forms within a scope that may be easily thought of by a person with ordinary skill in the art without departing the description of claims. The contents of theses, Japanese Patent laid-open publications and Japanese Patent publications stated in this specification are all referred to as quotations.

What is claimed is:

1. A lighting device provided on a ceiling of an interior of a vehicle, the lighting device comprising:
    a map lamp, including:
        a case comprising a central part and corners located at edges of the central part;
        a first light guide plate being inclined in the corners of the case with a prescribed angle relative to the central part of the case, and comprising a first light incident area on an end face and a first light radiation area on a flat plate surface of an interior side of the vehicle;

a first light source part comprising a plurality of LED lamps, the LED lamps being opposed to the first light incident area and arranged in an array; and a prism lens provided in a first light radiation area side, wherein the map lamp allows a light of the first light source part to be incident on the first light guide plate from the first light incident area, radiates the light from the first light radiation area to convert the light into a planar light, and then converts the light into a light advancing in a prescribed direction to light a prescribed area in the interior of the vehicle; and a vessel provided in the interior side of the vehicle with respect to the prism lens, the first light guide plate, a second light guide plate, and the prism lens being sandwiched between the case and the vessel; and a room lamp, including:

said second light guide plate provided integrally with the first light guide plate and comprising a second light incident area on an end face, a second light radiation area on the flat plate surface of the interior side of the vehicle and a connecting area connected to a side part of the first light guide plate on a side surface; and a second light source part having a plurality of LED lamps, the LED lamps being opposed to the second light incident area and arranged in an array, wherein the room lamp allows a light of the second light source part to be incident on the second light guide plate from the second light incident area and radiates the light from the second light radiation area to convert the light into the planar light to light the interior of the vehicle, and wherein the end face comprising the first light incident area and the end face comprising the second light incident area are located on a same virtual plane, and the first light source and the second light source are provided on a same base plate.

2. The lighting device according to claim 1, wherein the vessel is provided in the interior side of the vehicle with respect to the prism lens, sandwiches the first light guide plate, the second light guide plate, and the prism lens between the case and the vessel, and comprises a frame shaped protrusion for dividing a map lamp light emitting part corresponding to the first light radiation area and a room lamp light emitting part corresponding to the second light radiation area.

3. The lighting device according to claim 1,
wherein the vessel is provided in the interior side of the vehicle with respect to the prism lens, sandwiches the first light guide plate, the second light guide plate, and the prism lens between the case and the vessel, and comprises a frame shaped protrusion for dividing a map lamp light emitting part corresponding to the first light radiation area and a room lamp light emitting part corresponding to the second light radiation area.

4. The lighting device according to claim 1, wherein the vessel comprises a frame shaped protrusion for dividing a map lamp light emitting part corresponding to the first light radiation area and a room lamp light emitting part corresponding to the second light radiation area.

5. The lighting device with according to claim 1, wherein the vessel comprises a frame shaped protrusion for dividing a map lamp light emitting part corresponding to the first light radiation area and a room lamp light emitting part corresponding to a second light radiation area.

6. The lighting device according to claim 1, wherein the vessel is provided in the interior side of the vehicle with respect to the prism lens, and wherein the vessel comprises a frame shaped protrusion for dividing a map lamp light emitting part corresponding to the first light radiation area and a room lamp light emitting part corresponding to the second light radiation area.

7. The lighting device according to claim 1, wherein a thickness of the first light guide plate decreases from the end face of the first light guide plate toward an opposite end face of the first light guide plate.

8. The lighting device according to claim 1, wherein the central part of the case is uncovered by the prism lens.

9. A lighting device provided on a ceiling of an interior of a vehicle, the lighting device comprising:
a map lamp, including:
a case comprising a central part and corners located at edges of the central part;
a first light guide plate being inclined in the corners of the case with a prescribed angle relative to the central part of the case, and comprising a first light incident area on an end face and a first light radiation area on a flat plate surface of an interior side of the vehicle;
a first light source part comprising a plurality of LED lamps, the LED lamps being opposed to the first light incident area and arranged in an array; and
a prism lens provided in a first light radiation area side, wherein the map lamp allows a light of the first light source part to be incident on the first light guide plate from the first light incident area, radiates the light from the first light radiation area to convert the light into a planar light, and then converts the light into a light advancing in a prescribed direction to light a prescribed area in the interior of the vehicle; and
a vessel provided in the interior side of the vehicle with respect to the prism lens, the first light guide plate, a second light guide plate, and the prism lens being sandwiched between the case and the vessel; and
a room lamp, including:
said second light guide plate provided integrally with the first light guide plate and comprising a second light incident area on an end face, a second light radiation area on a flat plate surface of the interior side of the vehicle and a connecting area connected to a side part of the first light guide plate on a side surface; and
a second light source part having a plurality of LED lamps, the LED lamps being opposed to the second light incident area and arranged in an array,
wherein the room lamp allows a light of the second light source part to be incident on the second light guide plate from the second light incident area and radiates the light from the second light radiation area to convert the light into the planar light to light the interior of the vehicle, and
wherein a light shield unit is provided in the connecting area.

10. The lighting device according to claim 9, wherein the light shield unit comprises a slit shaped through hole along the side surface of the first light guide plate.

11. The lighting device according to claim 10, wherein the case includes a rib shaped protrusion fitted to the through hole.

12. A lighting device provided on a ceiling of an interior of a vehicle, the lighting device comprising:
a pair of map lamps, each of the map lamps comprising:
a case;
a first light guide plate accommodated in the case, and comprising a first light incident area on an end face and a first light radiation area on a surface of an interior side of the vehicle;

a first light source opposed to the first light incident area; and a prism lens provided in a first light radiation area side;

a room lamp provided between the pair of the map lamps, the room lamp comprising:

a second light guide plate comprising a second light incident area on an end face of the second light guide plate, a second light radiation area on the surface of the interior side of the vehicle; and a second light source being opposed to the second light incident area; and a vessel provided in the interior side of the vehicle with respect to the prism lens, the first light guide plate, the second light guide plate, and the prism lens being sandwiched between the case and the vessel, wherein the second light guide plate includes a connecting area connected to a side part of the first light guide plate on a side surface, and wherein a light shield unit is provided in the connecting area.

13. The lighting device according to claim 12, wherein the vessel comprises a frame shaped protrusion for dividing a map lamp light emitting part corresponding to the first light radiation area and a room lamp light emitting part corresponding to the second light radiation area.

14. The lighting device according to claim 13, wherein the first light guide plate is inclined with the prescribed angle relative to the second light guide plate.

15. A lighting device provided on a ceiling of an interior of a vehicle, the lighting device comprising:

a map lamp, including:
  a case;
  a first light guide plate accommodated in the case, and comprising a first light incident area on an end face and a first light radiation area on a flat plate surface of an interior side of the vehicle;
  a first light source part comprising a plurality of LED lamps, the LED lamps being opposed to the first light incident area and arranged in an array; and
  a prism lens provided in a first light radiation area side;
    wherein the map lamp allows a light of the first light source part to be incident on the first light guide plate from the first light incident area, radiates a light from the first light radiation area to convert the light into a planar light, and then converts the light into a light advancing in a prescribed direction to light a prescribed area in the interior of the vehicle;

a room lamp, comprising:
  a second light guide plate provided integrally with the first light guide plate and comprising a second light incident area on an end face of the second light guide plate, a second light radiation area on the flat plate surface of the interior side of the vehicle and a connecting area connected to a side part of the first light guide plate on a side surface; and
  a second light source part having a plurality of LED lamps, the LED lamps being opposed to the second light incident area and arranged in an array,
    wherein the room lamp allows a light of the second light source part to be incident on the second light guide plate from the second light incident area and radiates a light from the second light radiation area to convert the light into the planar light to light the interior of the vehicle; and a vessel which is provided in the interior side of the vehicle with respect to the prism lens, sandwiches the first light guide plate, the second light guide plate and the prism lens between the case and the vessel, and comprises a frame shaped protrusion for dividing a map lamp light emitting part corresponding to the first light radiation area and a room lamp light emitting part corresponding to the second light radiation area.

16. A lighting device provided on a ceiling of an interior of a vehicle, the lighting device comprising:

a pair of map lamps, each of the map lamps comprising:
  a case;
  a first light guide plate accommodated in the case, and comprising a first light incident area on an end face and a first light radiation area on a surface of an interior side of the vehicle;
  a first light source opposed to the first light incident area; and
  a prism lens provided in a first light radiation area side;

a room lamp provided between the pair of the map lamps, the room lamp comprising:
  a second light guide plate comprising a second light incident area on an end face of the second light guide plate, a second light radiation area on the surface of the interior side of the vehicle; and
  a second light source being opposed to the second light incident area; and a vessel provided in the interior side of the vehicle with respect to the prism lens, the first light guide plate, the second light guide plate, and the prism lens being sandwiched between the case and the vessel, wherein the end face comprising the first light incident area and the end face comprising the second light incident area are located on a same virtual plane, and the first light source and the second light source are provided on a same base plate.

* * * * *